United States Patent [19]

Richter et al.

[11] Patent Number: 4,556,233
[45] Date of Patent: Dec. 3, 1985

[54] TRAILER COUPLER

[75] Inventors: Karl E. Richter, Sheboygan; Edward W. Ebey, Nashotah, both of Wis.

[73] Assignee: Fulton Manufacturing Corporation, Milwaukee, Wis.

[21] Appl. No.: 555,519

[22] Filed: Nov. 28, 1983

[51] Int. Cl.$^4$ .............................................. B60D 1/06
[52] U.S. Cl. .................................................. 280/513
[58] Field of Search ............... 280/511, 513, 508, 507, 280/434

[56] References Cited

U.S. PATENT DOCUMENTS 2,925,286  2/1960  Hodges, Jr. .......................... 280/437
3,794,356  2/1974  Hollis, Jr. ............................. 280/513

*Primary Examiner*—Joseph F. Peters, Jr.
*Assistant Examiner*—Donn McGiehan

*Attorney, Agent, or Firm*—Steven L. Permut; Malcolm L. Sutherland; Leon E. Redman

[57] ABSTRACT

A coupler for a ball type hitch has a body member that includes a socket portion and a closure mechanism that is slidably mounted on the body member for movement between the open position, a closed position, and a third overshoot position. The closure mechanism includes a lower retaining plate and a latch plate which automatically latches when the closure mechanism achieves the closed position. A spring biases the closure mechanism from the open position to the closed position and third position. The closure mechanism is retained in the closed position when the coupler is engaged to a properly sized hitch ball. The closure mechanism is free to move to the third overshoot position when the coupler is engaged to an undersized ball. Visual indicators exit the coupler body member when the closure mechanism is in the open or third overshoot positions.

13 Claims, 9 Drawing Figures

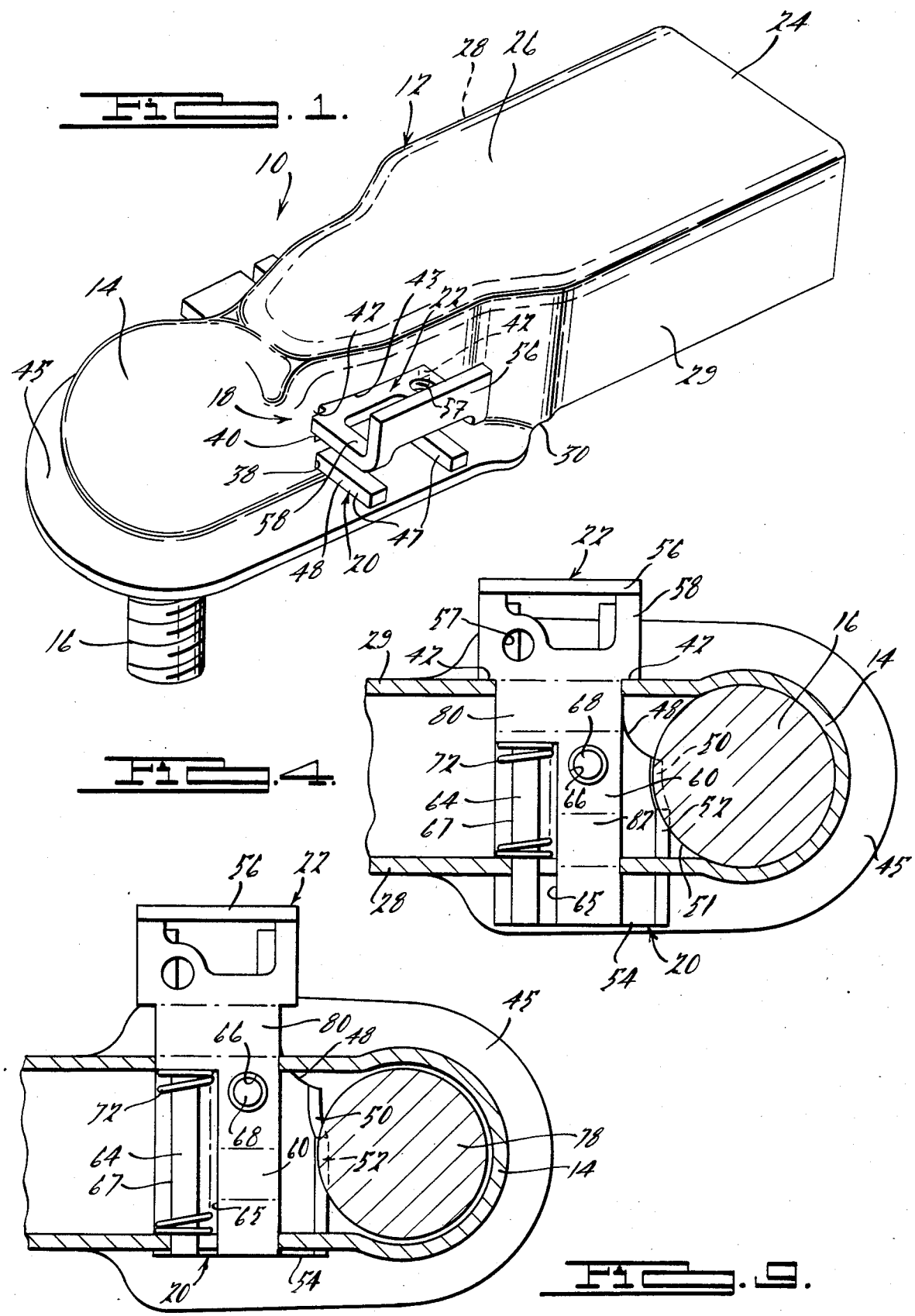

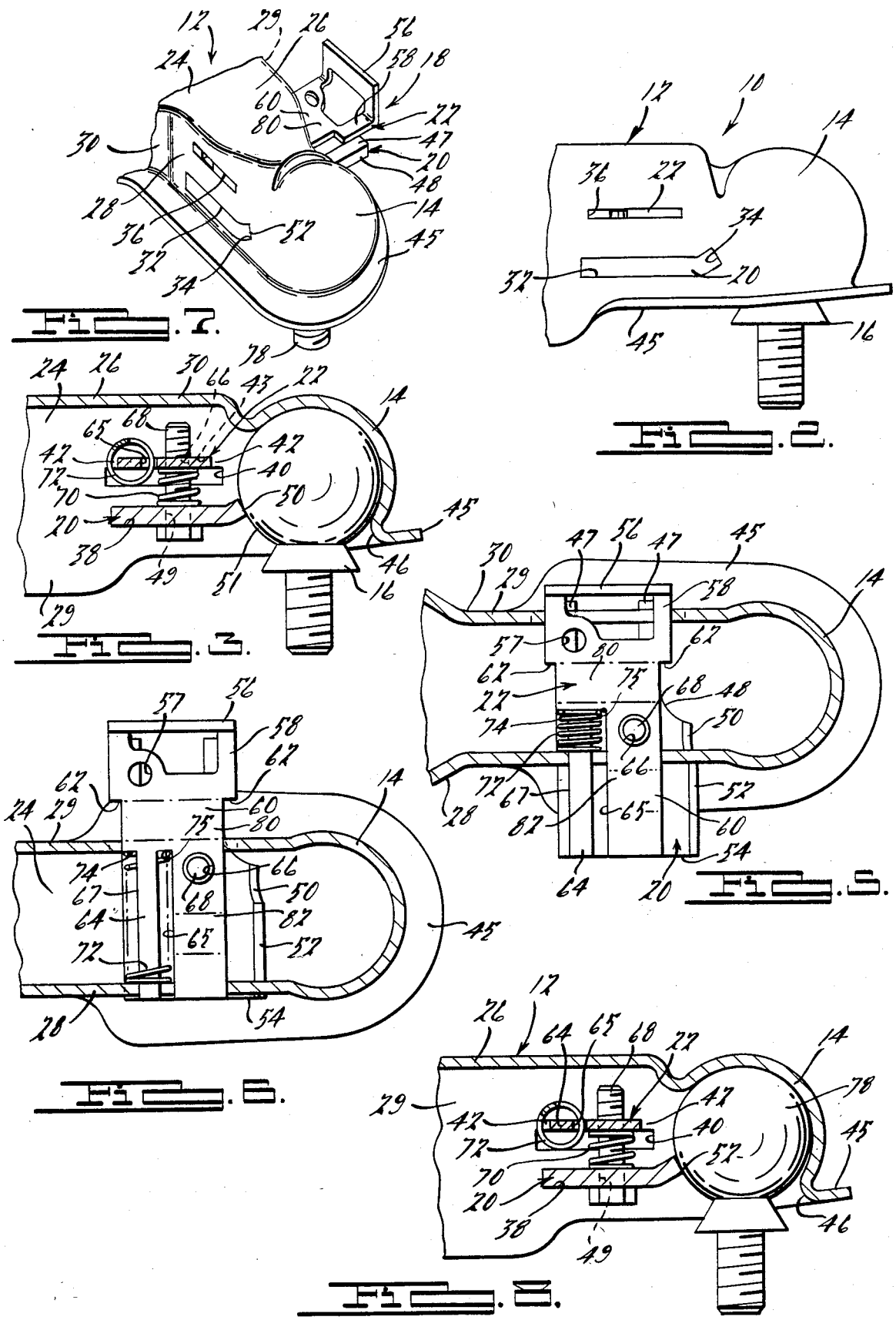

TRAILER COUPLER

BACKGROUND OF THE INVENTION

1. Technical Field

This invention relates to couplers for trailers and the like. More particularly, the invention relates to a coupler for use with a ball type hitch.

2. Disclosure Information

Couplers generally include a ball socket portion and an operable closure mechanism that clamps a ball hitch within the socket portion. Commonly each coupler is appropriately sized to fit a particular sized ball hitch. U.S. Pat. No. 3,794,356 issued to Hollis, Jr. on Feb. 26, 1974 discloses a coupler that includes a slidable closure mechanism shiftable between a closed and open position. The closure mechanism has a latch that retains the mechanism in the closed position.

U.S. Pat. No. 4,360,217 issued to Pittman on Nov. 23, 1982 discloses a coupler closure mechanism including a horizontal sliding plate that retains the ball hitch in the socket. The latching assembly can be incorporated in various bodies to clamp varying size balls.

What is needed is a self-closing coupler that indicates when a coupler is in the open position, when it is not engaging the hitch, or if it is engaging an undersized hitch.

SUMMARY OF THE INVENTION

In accordance with one aspect of the invention, a coupler has a body member wherein the body member has a socket portion for receiving a hitch, preferably one that incorporates a ball. A horizontally disposed retainer plate is mounted on the body member for movement between the open position, a closed position, and a third overshoot position beyond the closed position. The plate, when in the third overshoot position, visibly indicates that the coupler is engaging an undersized hitch ball or is otherwise disengaged from a hitch ball when in the third position.

Preferably, the body member has opposing sidewalls with a horizontal slot through each wall. The retainer plate is mounted for horizontal movement through the slots. The retainer plate preferably has an end section with a recessed front edge such that when the retainer plate is in the open position, the recessed front edge is aligned with the socket to allow a hitch ball to enter and exit the socket. The retainer plate has an engaging middle section with a forwardly curved edge extending from the recessed front edge such that when the retainer plate is in the closed position, the curved engaging edge abuts a properly sized ball and prevents the retainer plate from further movement toward the third overshoot position. In addition, the engaging edge prevents the ball from exiting the socket. A straight edge is adjacent and forwardly positioned from the engaging edge such that when an undersized ball is in the socket, the retainer plate is free to slide to the third overshoot position and the straight edge prevents the undersized ball from freely exiting the socket portion.

A horizontal latch plate is positioned in proximity and parallel to the retainer plate and operably connected thereto for sliding movement therewith. The latch plate has a latch mechanism to latch the closure mechanism in the closed position and prevent it from inadvertently sliding to the open position. Preferably, the latch plate is biased in a direction transverse to the direction of movement of the latch plate and retainer plate member to automatically latch the closure mechanism when it is in the closed position. The latch plate is preferably positioned vertically above the retainer plate and extends through a second pair of slots through the side walls of the body member with a first spring biasing the latch plate upwardly.

The latch plate also has a section mounting a second spring which biases both plates away from the open position. The latch plate also has a first indicator section which is visibly positioned outside the body member only when the closure mechanism is in the open position. The latch plate has a second indicator section also visibly positioned to the exterior side of the body only when the plates are in the third overshoot position.

More broadly, this invention relates to a coupler that has a closure mechanism movable between three positions: an open position, a second closed position, and a third overshoot position that indicates an undersized ball hitch is being used or the coupler is disengaged from the ball hitch.

Another aspect of the invention relates to a coupler body member having a closure member movable between an open position and a closed position with biasing means for biasing the closure member toward the closed position and away from the open position.

BRIEF DESCRIPTION OF THE DRAWING

Reference now will be made to the accompanying drawings in which:

FIG. 1 is a left front perspective view of the preferred embodiment of a coupler according to the invention in the closed position engaging a properly sized hitch ball;

FIG. 2 is a right side elevational view of the coupler shown in FIG. 1;

FIG. 3 is a partially segmented side elevational view of the coupler;

FIG. 4 is a segmented top elevational view of the coupler;

FIG. 5 is a view similar to FIG. 4 with the closure mechanism moved to the open position and the hitch ball removed;

FIG. 6 is a view similar to FIG. 5 with the latch mechanism moved to the third position;

FIG. 7 is a fragmentary right perspective of the coupler shown coupled to an undersized hitch ball;

FIG. 8 is a view similar to FIG. 3 showing the coupler in the third position engaging an undersized hitch ball; and FIG. 9 is a view similar to FIG. 4 showing the coupler engaging an undersized hitch ball.

DETAILED DESCRIPTION OF THE PREFERRED EMBODIMENT

Referring to FIGS. 1–4, a coupler 10 has a body member 12 that includes a socket portion 14 that can receive a hitch ball 16 of a conventional hitch. A closure mechanism 18 includes a lower horizontal retainer plate 20 and a upper horizontal latch plate 22 that are mounted in a transverse direction across the body member 12.

In more detail, the body member 12, a one piece stamping, has a channel section 24 that can be secured in a conventional fashion bolted to a tongue (not shown). The channel section 24 has a top wall 26 and two side walls 28 and 29. The side walls 28 and 29 converge toward each other at an intermediate section 30. The side wall 28 has a lower slot 32 that has an upwardly curved forward end 34 and a upper slot 36 vertically spaced above the lower slot 32. Side wall 29 has a straight lower slot 38 and a stepped upper slot 40 with shoulders 42 formed at each edge of the upper section 43 of slot 40. The lower slots 32 and 38 are aligned and located toward the bottom of walls 28 and 29 to slidably mount retainer plate 20. Slots 36 and 40 are aligned to slidably mount latch plate 22. Socket portion 14 is forwardly positioned of the immediate section 30. A lower lip 45 outwardly extends from the intermediate section 30 and socket portion 14. The lower lip 45 has a rounded cam section 46.

The retainer plate 20 is slidably mounted in the lower slots 32 and 38 for movement in a horizontal direction transverse to the longitudinal axis of the body member. The retainer plate 20 has a narrow section 47 which slidably fits within slot 38. The narrow section 47 has a recessed front edge 48 that allows the ball 16 to end and exit socket 14. The front edge 48 merges into a forwardly curved engaging edge 50. The curved engaging edge 50 is curved to abut against the spherical surface 51 of a properly sized hitch ball 16. The curved engaging edge 50 abuts surface 51 of hitch ball 16 at a position below the horizontal equater of the hitch ball 16. Behind the engaging edge 50, the plate 20 has an aperture 49 therethrough. The edge 50 merges into the front retaining edge 52 of a wide portion 54 which fits within the lower slot 52. Both the engaging edge 50 and front retaining edge 52 are inclinded upwardly to abut a lower portion of a ball surface.

The latch plate 22 has a vertical extending handle 56 integral with a wide section 58. Wide section 58 has an aperture 57 therethrough. The latch plate 22 also has a narrow section 60 with shoulders 62 formed between section 60 and wide section 58. The narrow section 60 has an aperture 66 therethrough. A bolt threadably engages aperture 49 in the retainer plate 20 and freely passes through aperture 66 in the latch plate. A spring 70 is interposed between the two about the bolt 68 to upwardly bias the latch plate 22. The latch plate 22 also has a cutaway 67 and a slot 65 to form a post section 64. A second spring 72 is mounted on post section 64 interposed between side wall 28 and shoulders 74 and 75 in plate 22 for biasing both plates toward wall 29 such that the latch plate handle 56 must be manually pushed toward the open position against the bias of spring 72.

As shown in FIG. 5, when the coupler is in the open position, the latch plate 22 has its wide section 58 seated within the lower section of upper slat 40. The front recessed edge 48 of the retainer plate 28 opens up the socket portion 14 to allow the ball 16 to be received within the socket portion or to be removed therefrom. Narrow section 60 can have a label section 82 exposed to the exterior of the coupler appropriately marked to indicate the coupler is in the open position. When a properly sized ball 16 is received in the socket portion, the handle 56 is then released and the spring 72 automatically moves the retaining plate 20 to its closed position wherein the curved engaging edge 50 abuts the ball hitch 16 as shown in FIGS. 3 and 4. The coil spring 72 has sufficient strength to retain the retainer plate 22 in the closed position against any normal vibrations encountered by the coupler.

In addition, the closure mechanism 18 automatically latches in the closed position. The wide section 58 of plate 22 exits from the upper slot 40 to allow the narrow section 60 to move upwardly by the bias of spring 70 into the upper section 43 of slot 40 such that the shoulders 42 of the wall and the shoulder 62 of the latch plate 22 are adjacent each other as shown in FIGS. 1 and 4. Before the latch plate can be moved toward the open position against the bias of spring 72, the latch plate 22 must be pressed downwardly against the upward bias of spring 70.

Furthermore, the aperture 57 can receive a padlock (not shown) which deters unauthorized opening of the coupler.

If the coupler is secured on a moderately undersized ball 78 as shown in FIGS. 7-9, the engaging edge 50 will not abut the ball such that the spring 72 will continue to bias both plates toward the right (with reference to FIG. 7) and continue to move the narrow section 60 of latch plate 22 through the slot 40. The narrow section 60 then becomes exposed to the exterior side of side wall 29 as shown in FIGS. 7 and 9. The exposed narrow section 60 can have a label section 80 appropriately marked to indicate that the closure mechanism is in the third position. As shown in FIG. 8, if the undersized ball 78 is only moderately undersized, (e.g. a 1⅞ inch size is used instead of a properly sized 2 inch ball) the front retaining edge 52 presents an obstacle against the ball 78 from freely exiting the socket portion 14 while the label section 80 simultaneously provides a visable indicator that the coupler is engaging an undersized ball.

When the coupler is disengaged from the hitch, the closure mechanism is biased to the third position, as shown in FIG. 6. If per chance the coupler is merely placed upon the hitch ball while the closure mechanism is in the third position, the inner rounded cam section 46 and retaining plate 20 rests upon an extremely high portion of the hitch ball 16 such that when any horizontal force is exerted on the coupler or hitch, the coupler and hitch immediately disengage.

In this fashion, a coupler has a closure mechanism that indicates when an undersized ball is being used as well as when the closure mechanism is in the open or closed position.

In addition, a coupler mechanism provides for automatic closing of the coupler on a properly sized ball and has secondary latching capabilities to prevent the coupler from undesirably opening.

Variations and modifications of the present invention are possible without departing from its scope and spirit as defined by the appended claims.

The embodiments of the invention in which an exclusive property or privilege is claimed are defined as follows:

1. A coupler for use with a hitch system, said coupler comprising:
    a body member having a socket portion for receiving said hitch system; and
    a closure means movably mounted on said body member for movement to an open position, closed position, and a third position such that said hitch system can enter and exit said socket portion when said closure means is in an open position, said hitch system being locked in said socket portion when said closure means is in said closed position, and said closure means providing a visible indication that said socket portion has received an undersized hitch or is disengaged from said hitch system when in said third position.

2. A coupler as defined in claim 1 wherein said closure means includes:

a horizontally positioned and slidably movable retainer plate;

said retainer plate having a recessed front edge aligned with said socket portion when in said open position to allow a hitch system to enter and exit said socket portion;

said retainer plate having an engaging front edge aligned with said socket for engaging a properly sized hitch system when in said closed position; and biasing means for biasing said retainer plate away from said open position and to said closed position when said properly sized hitch system is received in said socket.

3. A coupler as defined in claim 2 wherein said plate is mounted through opposing side walls in said body member and is mounted for slidable movement transverse to said side walls.

4. A coupler as defined in claim 3 wherein said retainer plate is mounted through lower portions of said side walls such that when said plate is in said third position and said coupler is positioned on said properly sized hitch system but not latched to said hitch system, said plate and said body member rest on an upper portion of said hitch system such that lateral forces disengage said coupler from said hitch system.

5. A coupler as defined in claim 3 wherein when a moderately undersized hitch system is received in said socket portion, said plate moves to said third positon to indicate an undersized hitch system is being used and to latch said hitch system in said socket portion thereby preventing said hitch system from freely exiting said socket portion.

6. A coupler for use with a hitch ball, said coupler comprising:

a body member having a socket portion for receiving said hitch ball;

a retainer plate slidably mounted on said body member for horizontal movement in a transverse direction with respect to a longitudinal axis of said body member between an open position and a closed position;

a latch plate slidably mounted on said body member for movement in the same direction as said retainer plate;

said latch plate being connected to said retainer plate for movement therewith;

biasing means for biasing said latch plate in a direction transverse to the said direction of motion of said retainer plate such that when said retainer plate is in said closed position, said biasing means moves said latch plate to a latched position with respect to said body member.

7. A coupler as defined in claim 6 wherein:

said retainer plate and latch plate are vertically spaced from each other.

8. A coupler as defined in claim 7 wherein said body member has two spaced apart side walls;

each side wall has a slot for slidably receiving said retainer plate;

each side wall has a second slot for slidably receiving said latch plate;

one of said second slots is stepped with a narrower section sized to receive a narrow portion of said latch plate;

said biasing means biasing said narrow portion of said plate into said narrow section of said stepped slot; and said latch plate having outwardly extending shoulders adjacent said narrow portion to engage said side wall adjacent said narrow section of said stepped slot to latch said latch plate and retainer plate in said closed position.

9. A coupler as defined in claim 8 wherein:

said retainer plate abuts a properly sized hitch ball in said socket when in said closed position;

said retainer plate and latch plate are free to move from said open position to a third position beyond said closed position with said latch plate having its narrow section exiting said stepped slot and providing a visible indication when said retainer plate and latch plate are in the third position.

10. A coupler as defined in claim 9 wherein:

a second biasing means biases said retainer plate and latch plate to said third position.

11. A coupler as defined in claim 7 wherein said latch plate is positoned vertically above said retainer plate and is biased away from said retainer plate.

12. A coupler for use with a hitch ball, said coupler comprising:

a body member having a socket portion for receiving said hitch ball;

a closure means movably mounted on said body member for movement between an open position such that said hitch ball can enter and exit said socket portion and a closed position for locking said hitch ball in said socket portion; and an indicator means for indicating if said hitch ball is undersized for said coupler.

13. A coupler as defined in claim 12:

said indicator means visually indicates when said closure means is in the open position and when said hitch ball is undersized for said coupler.

* * * * *